United States Patent [19]
Reinhardt et al.

[11] 3,764,659
[45] Oct. 9, 1973

[54] PROCESS FOR THE PRODUCTION OF CALCIUM HEXACYANOFERRATE (II)

[75] Inventors: Helmut Reinhardt, Weiss; Karl Trebiner, Wesseling, both of Germany

[73] Assignee: Deutsche Gold-und Silber-Scheideanstalt, Frankfurt am Main, Germany

[22] Filed: Nov. 2, 1970

[21] Appl. No.: 86,276

[30] Foreign Application Priority Data
Nov. 15, 1969 Germany.................... P 19 57 527.0

[52] U.S. Cl. ................................ 423/367, 423/236
[51] Int. Cl. ................................................ C01c 3/12
[58] Field of Search ................. 23/359, 77; 423/367

[56] References Cited
UNITED STATES PATENTS
2,113,198   4/1938   Nonhebel et al. ................. 23/2 SQ FOREIGN PATENTS OR APPLICATIONS
144,210   8/1903   Germany ................................ 23/77

Primary Examiner—M. Weissman
Attorney—Cushman, Darby & Cushman

[57] ABSTRACT

Calcium hexacyanoferrate-(II) is prepared by suspending 1 mole of calcium carbonate in an aqueous solution of 1 mole of ferrous salt and reacting at 30° – 90° C. with 2 moles of hydrogen cyanide at a pH of 2 – 5 and then adding an aqeous suspension of 2 moles of calcium hydroxide and 4 moles of hydrogen cyanide at 30° – 90° C. at a pH of at least 8.

8 Claims, No Drawings

PROCESS FOR THE PRODUCTION OF CALCIUM HEXACYANOFERRATE (II)

It is known to produce calcium hexacyanoferrate (II) by reaction of hydrogen cyanide, ferrous salt solutions and calcium hydroxide. Hydrogen cyanide, in such procedures, can be added in either liquid or gaseous form, or in the form of hydrocyanic acid containing gas. In the subsequent treatment of calcium hexacyanoferrate (II) (calcium ferrocyanide) to form the corresponding alkali cyanoferrate, a considerable portion of the calcium accumulates as calcium carbonate. It is also known according to German Pat. No. 144,210, to react hydrocyanic acid containing gases with iron (II) (ferrous) salt solutions and calcium carbonate. The calcium hexacyanoferrate (II) formed, however, is not pure. Besides the reaction also is industrially not interesting.

It has now been found that in the production of calcium hexacyanoferrate (II) by reaction of liquid or gaseous hydrogen cyanide with ferrous salt solutions and calcium hydroxide or calcium carbonate to suspend 1 mole of calcium carbonate in an aqueous solution of 1 mole of ferrous salt and react at 30° – 90° C. with 2 moles of hydrogen cyanide at a pH of 2 – 5, whereupon so much of an aqueous suspension containing 2 moles of calcium hydroxide and 4 moles of hydrogen cyanide are measured in, with stirring, at 30° – 90° C. that the pH of the reaction solution does not go below eight. The resulting solution of calcium hexacyanoferrate (II) can be worked up in known manner. The calcium hexacyanoferrate (II) is very pure and free of calcium cyanide.

The pH in the second step can be 8 to 13.

The hydrocyanic acid can be added in either liquid or gaseous form. Preferably, it is in liquid form.

The aqueous calcium carbonate suspension contains about 10 to 50 weight % of calcium carbonate. This calcium carbonate, preferably, comes from the production of alkali hexacyanoferrate (II). As aqueous iron (II) salt solutions there can be used solutions containing at least 20 grams of $Fe^{++}$ per liter (and up to saturation). There can be used pure solutions, or the so called waste acids from other fields which are more or less strongly acid. The iron can be present as ferrous chloride, ferrous sulfate or ferrous nitrate, preferably, as ferrous chloride.

Preferred temperatures in both reaction steps are 60° to 70° C., the preferred pH in step 1 is 4, and in step 2, is 8 to 12.

The pure product can be recovered in known way from the reaction solution which contains calcium hexacyanoferrate (II), by filtration, concentration of the filtrate and finally crystallization.

The technical advance of the process of the invention, besides the use of waste product lime, is that the exothermic reaction as such can be completely controlled since the introduction of the hydrogen cyanide begins in the acid medium. In this way there is completely avoided heating too quickly the reaction medium through the sudden exothermic heat and hydrocyanic acid loss by vaporization. Moreover, the reaction is now easy to control. It should be observed that by addition of lime, 1 mole of calcium hydroxide per mole of hexacyanoferrate (II) per mole of calcium is saved.

Unless otherwise indicated all parts and percentages are by weight.

The invention will be further explained by the example:

EXAMPLE 120 grams (1.2 moles) of $CaCO_3$ were suspended in 300 cc. of water and there was added a solution of 158.5 grams of $FeCl_2$ (corresponding to 70 grams Fe, 1.25 moles) in 400 cc. of water.

The mixture was heated to 60° C., with stirring, while there was fed in over 16 minutes, 64.8 grams (2.4 moles) of liquid hydrocyanic acid with a density of 0.7 diluted with water in the ratio 1 : 1.

During the first reaction step the temperature was held in the range of 60° to 70° C. The pH was adjusted to 4.

In the immediately following second reaction step, to the reaction suspension there were added over a period of 42 minutes, 190 grams of $Ca(OH)_2$ (2.50 moles) as a suspension in 400 cc. of water and also 129.6 grams of liquid hydrocyanic acid (4.8 moles) with a density of 0.7 diluted with water in the ratio of 1 : 1. The temperature in the second reaction step likewise amounted to 60° to 70° C. The reaction solution having a pH of 10 was stirred further for a short period of time and then discharged.

There were obtained 1,950 cc. of a solution having a density of 1.19 gram/cc. This solution contained 15 grams per liter of dry solids, 4.0 grams per liter of $Ca(OH)_2$ and 312 grams per liter $Ca_2[Fe(CN)_6] \cdot 12 H_2O$. By filtration, concentration of the filtrate and crystallization there were obtained pure $Ca[Fe(CN)_6] \cdot 12 H_2O$.

The yield was 98 weight % based on the hydrocyanic acid added.

We claim:

1. A process for the production of calcium hexacyanoferrate II comprising reacting 1 mole of calcium carbonate suspended in an aqueous solution of 1 mole of a ferrous salt selected from the group consisting of ferrous chloride, ferrous sulfate and ferrous nitrate at 30° to 90° C. with 2 moles of hydrogen cyanide at a pH of 2 to 5 with stirring, measuring in (a) an aqueous suspension of 2 moles of calcium hydroxide and 4 moles of hydrogen cyanide with stirring at 30° to 90° C. so that the pH does not go below 8 and (b) recovering the calcium hexacyanoferrate (II) produced.

2. A process according to claim 1 wherein the hydrogen cyanide is added as liquid hydrocyanic acid.

3. A process according to claim 2 wherein the reaction is carried out at 60° to 70° C.

4. A process according to claim 3 wherein the first reaction step is carried out at a pH of 4 and the second reaction step is carried out at a pH of 8 to 12.

5. A process according to claim 4 wherein the ferrous salt is ferrous chloride.

6. A process according to claim 1 wherein the ferrous salt is in the form of ferrous salt containing waste acid.

7. A process according to claim 1 wherein the ferrous salt is ferrous chloride.

8. A process for the production of calcium hexacyanoferrate (II) comprising reacting 1 mole of calcium carbonate suspended in an aqueous solution of 1 mole of a ferrous salt selected from the group consisting of ferrous chloride, ferrous sulfate and ferrous nitrate at 30° to 90° C. with 2 moles of hydrogen cyanide at a pH of 2 to 5 with stirring, measuring in an aqueous suspension of 2 moles of calcium hydroxide and 4 moles of hydrogen cyanide with stirring at 30° to 90° C. in such manner that the pH does not go below 8 and recovering the calcium hexacyanoferrate (II) produced.

* * * * *